United States Patent
Carroll et al.

(10) Patent No.: US 9,322,588 B2
(45) Date of Patent: Apr. 26, 2016

(54) HOT OR COLD DUAL INSULATING FOOD SERVICE ASSEMBLY

(71) Applicants: Maureen Carroll, Atlanta, GA (US); Michael E. Docherty, Boca Raton, FL (US); Brian Gyoerkoe, Jupiter, FL (US); Alyssa Enderle, Warwick, RI (US)

(72) Inventors: Maureen Carroll, Atlanta, GA (US); Michael E. Docherty, Boca Raton, FL (US); Brian Gyoerkoe, Jupiter, FL (US); Alyssa Enderle, Warwick, RI (US)

(73) Assignee: Fit & Fresh, Inc., Providence, RI (US)

( * ) Notice: Subject to any disclaimer, the term of this patent is extended or adjusted under 35 U.S.C. 154(b) by 78 days.

(21) Appl. No.: 14/166,977

(22) Filed: Jan. 29, 2014

(65) Prior Publication Data

US 2015/0210464 A1   Jul. 30, 2015

(51) Int. Cl.
  *F25D 3/08* (2006.01)
  *B65D 81/38* (2006.01)

(52) U.S. Cl.
  CPC .............. *F25D 3/08* (2013.01); *B65D 81/3834* (2013.01)

(58) Field of Classification Search
  CPC .............. A47J 41/0077; A47J 41/0072; A47J 41/0055; A47G 19/027; A47G 19/02; A47G 23/0683; A47G 23/06; F25D 3/08; B65D 81/3823; B65D 81/382; B65D 81/3818; B65D 81/3816; B65D 81/3813; B65D 81/3834; B65D 81/3832; B65D 81/383; B65D 81/3827; B65D 81/3825; B65D 1/34; B32B 5/245; B32B 5/22; B32B 5/18; B32B 5/32; B32B 9/046
  USPC ......... 220/592.21, 592.2, 592.25, 575, 574.2, 220/574, 62.22, 62.18, 62.13, 556, 555, 220/23.83, 23.86, 23.88; 428/36.5
  See application file for complete search history.

(56) References Cited

U.S. PATENT DOCUMENTS

| | | | | |
|---|---|---|---|---|
| 1,336,776 | A * | 4/1920 | Drinkwater | A47J 47/00 126/261 |
| 3,002,646 | A * | 10/1961 | Lewis | B65D 1/265 220/62.11 |
| 3,434,849 | A * | 3/1969 | Carbone | B65D 5/5415 229/227 |
| 3,738,527 | A * | 6/1973 | Townsend | B65D 90/046 220/560.05 |
| 3,799,386 | A * | 3/1974 | Madalin | B65D 25/2897 206/564 |
| 4,225,052 | A | 9/1980 | Tector | |
| 4,478,349 | A | 10/1984 | Haverland, Jr. et al. | |
| 4,533,061 | A * | 8/1985 | Herbst | B65D 81/3823 206/545 |
| 5,052,369 | A | 10/1991 | Johnson | |
| 5,329,787 | A * | 7/1994 | Friday | F25D 3/08 62/372 |
| 5,390,797 | A | 2/1995 | Smalley | |
| 5,857,778 | A * | 1/1999 | Ells | A45C 11/20 383/110 |
| 6,152,319 | A * | 11/2000 | Kamachi | A47J 41/0077 220/592.2 |
| 6,244,458 | B1 * | 6/2001 | Frysinger | B65D 81/3823 220/592.09 |

(Continued)

FOREIGN PATENT DOCUMENTS

| | | | | |
|---|---|---|---|---|
| AU | 8650082 | | 7/1982 | |
| GB | 904650 | A * | 8/1962 | .......... A47J 41/0077 |

(Continued)

*Primary Examiner* — Robert J Hicks
(74) *Attorney, Agent, or Firm* — Chace Ruttenberg & Freedman, LLP (57) ABSTRACT

Provided is a dual purpose insulating food serving assembly having a receptacle composed of interior and exterior thermoplastic shells sealed to each other and forming an interior chamber containing a laminate composed of at least one layer of reflective material and at least one layer of foam. A separate, removable, food serving dish is disposed within the receptacle. The assembly optionally includes a demountable lid and one or more removable ice packs.

36 Claims, 5 Drawing Sheets

(56) References Cited

U.S. PATENT DOCUMENTS

| | | |
|---|---|---|
| 6,668,577 B2 | 12/2003 | Quenedey |
| 2012/0024855 A1* | 2/2012 | Smyers .................... B65D 1/34 220/324 |
| 2014/0262867 A1* | 9/2014 | Weinberg ............... A45D 34/00 206/229 |

FOREIGN PATENT DOCUMENTS

| | | | |
|---|---|---|---|
| GB | WO 0047401 A1 * | 8/2000 | ................ B32B 5/24 |
| GB | 2447234 | 10/2008 | |
| NL | 1019227 | 4/2003 | |
| WO | WO2012085212 | 6/2012 | |

* cited by examiner

HOT OR COLD DUAL INSULATING FOOD SERVICE ASSEMBLY

FIELD OF THE INVENTION

The invention is in the field of food service. More particularly, the invention concerns dishes and other food and beverage serving containers that can be used to maintain the temperatures of either hot or cold foods.

FEDERALLY SUPPORTED RESEARCH

None.

BACKGROUND OF THE INVENTION

Known are double-walled insulating dishes for storing and handling hot or cold foods and beverages to maintain their temperature at a constant level over an extended period of time. Great Britain Patent Publication No. 22447234A is exemplary. It discloses a food and drink container composed of an inner vessel and an insulated outer shell with a compartment there between containing a phase change material. The inner vessel is composed of stainless steel, aluminum or copper and the insulating material of the outer shell is an expanded polyurethane, polyethylene, polystyrene, aerogel or open or closed cell foam. The phase change material is a crystalline salt and a wax, fatty acid, fat, heavy alcohol or crystalline alkyl hydrocarbon. A lid is made of the same materials. U.S. Pat. No. 5,052,369 similarly discloses a heat maintaining food container composed of a body and a lid, each of which is formed with a compartment containing an insulating layer and a heat storing material. The insulating layer is closed cell foam such as Ensolite®, or preferably foamed polyurethane. The heat storing material is a paraffin base or micro crystalline wax.

Insulating layers other than waxes and the like are also known. U.S. Pat. No. 5,390,797 discloses a heat maintaining food storage container have a base and a hinged lid, both of which have a non-removable insulating liner composed of a closed cell foam rubber or closed cell foamed plastic. U.S. Pat. No. 6,668,577 discloses an insulated container for maintaining cold contents composed of a polypropylene case, a polystyrene insulating lining, a diffuser cover that includes an independent refrigeration source, a receptacle to hold the refrigeration source and an aluminum thermal bridge to assist in uniform distribution of the refrigeration. The diffuser cover and receptacle are formed from a single board of deformable thermal insulating material such as honeycombed polypropylene. POT Patent Application EP2011/073806, published as WO2012/085212, discloses a wall construction for thermally insulated containers for mobile catering. The container is made of inner and outer walls composed of a thermoplastic polymer. On the inner wall is a film formed from a thermoplastic polymer or polymeric foam having rib like stiffening projections. Between the film and the outer wall may be a vacuum insulation foam plastic honeycombed layer or panel. Disclosed materials to be used in the construction of the inner layer polyester or polyethylene variants such as LLDPE and metalized polyphenylene sulfide (PPS), polyethertherketone (PEEK), polysulfone (PSU), polyphynylene sulfone (PPSU), polyether (PES/PESU), polyetherimide (PEI), liquid crystal polymer (LCP) or styrene. The vacuum insulation panel may include an aerogel. The inner and outer walls are glued or welded together to form a single, solid unit.

U.S. Pat. No. 4,478,349 discloses a double-walled heating vessel including a lid, an outer container, and a removable inner container with a flange that allows it to set within the outer container, leaving an air space between the two. The components are made of polysulfone plastic (Udel®, Union Carbide) and U.S. Pat. No. 4,225,052 discloses a covered serving dish having an outer wall and an inner wall, both of which are formed of high-impact polyethylene or polystyrene. Between the two walls is a layer of insulating material such as expanded polystyrene or polyurethane. The serving dish cover is formed in the same way. Both disclosures appear pertinent to maintaining hot foods.

The abstract of Netherlands Patent Application Publication No. 1019227 discloses a refrigerated food serving system comprising a first box that can be sealed by placing a second box on top of it. A cooling element is disposed within the first box and sits on spacer elements or ribs in the base of the box, and a food dish is placed on top of the cooling element. The base of the first box is composed of a thermal insulation material and the side walls are made from a porous or breathable material. An air gap between the side walls and the food dish allows air circulation. Australia Patent Application Publication No. 86 500/82 discloses an insulated serving dish having a hinged lid for maintaining hot foods. The dish and the lid are composed of an external shell and an internal shell and between the shells is a heat insulating material such as polystyrol foam. A removable glass bowl contains the food and the external shell is provided with a peripheral rim that cooperates with an outwardly bent flange extension of the lid to form a bendable hinge.

As can be seen from the foregoing, there are a variety of insulators and food receptacle constructions that are already known it the art. Some maintain the cold temperature of the contents but cannot be used with hot contents and others maintain the hot temperature of the contents and cannot be used with cold contents. Others can be used for either hot or cold foods, but only if the construction and materials are modified. (See for example, POT Patent Publication WO20121085212,)

It would be advantageous to have to a food container that has the ability to insulate both hot and cold foods or beverages without modification to the structure or components of the structure. Such a dual purpose hot or cold insulating food service assembly is provided by the invention.

SUMMARY OF THE INVENTION

Provided is a food serving assembly composed of a dual purpose insulating receptacle having the general shape of a serving dish with a flat bottom and upwardly extending side walls. The receptacle is composed of an interior thermoplastic shell and an exterior thermoplastic shell sealed to each other about the edges to form an interior chamber. A food serving dish is disposed within the receptacle.

The interior and exterior thermoplastic shells may be composed of a wide variety thermoplastic or thermoset plastic materials. Preferred thermoplastic materials include polypropylene (PP), polyvinyl chloride (PVC), low density polyethylene (LDPE), polystyrene (PS), polytetrafluroethylene, polyarylsulfone (PESU), polycarbonate (PC), polymethylpentene (PMP), polytetrafluoroethylene (PTFE), polymethyl methacrylate (PMMA), styrene-acryonitrile (SAN) and acrylonitrile butadiene styrene (ABS). Most preferred is PP. Preferred thermoset plastic materials include polyurethanes, polyesters, epoxy resins, urea formaldehyde, melamine resin and polyimide. The interior and exterior shells of the receptacle are inductively welded together, although this in not critical and other methods well known in the art may be employed.

The interior chamber of the receptacle contains a laminate composed of one or more layers of a reflective material and one or more layers of an open or closed cell foam. Exemplary reflective materials that may be used include a reflective polyester film such as Mylar®, an aluminum foil film, an air bubble film and aluminum foil such as Aerolam® and aluminum foil affixed polyethylene (PE) foam. Preferred as the reflective material is aluminum foil affixed PE foam. Preferred as the open or closed cell foam is polyethylene (PE) foam, although other open or closed cells foams may be substituted for PE foam. Exemplary are spray polyurethane foam (SPF), polyisocyanurate foam, closed cell polyurethane spray foam, vacuum insulated panel foam, CFC/HCFC expanded polyurethane rigid panel foam, foil-faced polyurethane rigid panel foam, polyisocyanurate spray foam, phenolic spray foam, urea-pormaldehyde panel foam, urea foam, extruded expanded polystyrene (XPS), polystyrene board foam, phenolic rigid panel foam, urea-formaldehyde foam, As an alternative to an open or closed cell foam, other materials may be used, for example, high-density fiberglass batting, icynene loose fill, cellulose, fiberglass, perlite, vermiculite, Thermolam®, and Insul-Bright®.

The laminate disposed within the interior chamber of the receptacle may be composed of an additional one or more layers of a high performance insulator, such as for example an aerogel or a microfiber thermal insulation material (polyethylene terephthalate and optionally polypropylene) such as Thinsulate® (available from 3M, St. Paul, Minn.). Exemplary aerogels are silica aerogels, carbon aerogels and metal oxide aerogels. Specific aerogels that may be used include Pyrogel XTF, Pyrogel XT, Cryogel Z, Cryogel x201, Pyrogel 2250, Pyrogel 6650, Spaceloft, Spaceloft Subsea (all available from Aspen Aerogels, Inc. Northborough, Mass.) and Aerogel Thermal Wrap (available from Cabot Corporation, Boston, Mass.).

In a preferred embodiment, the laminate is a one layer laminate in which the foam s disposed between a high performance insulator and the reflective material.

The assembly of the invention may additionally include a demountable lid composed of plastic. The lid may be fully removable or hinged. If hinged, the lid may be either hingably coupled to the receptacle or hingably coupled to the serving dish, Preferred plastics employed in making the lid are copolyesters and especially preferred is Tritan® copolyester.

The assembly of the invention may also include a removable lid cover preferably composed of a foam material and shaped so as to substantially conform to the outer dimensions of the lid so as to be superposable thereon. While foam is preferred, the lid cover could also be composed of a non-foam lid construction, or a hollow housing construction with inner insulative materials. In the preferred embodiment, ethylene vinyl acetate foam is the preferred material for the lid cover.

The food serving dish may be composed of glass or of plastic, or of stoneware, or a high-temperature plastic. If glass, borosilicate glass or tempered soda lime glass are preferred. If plastic, ABS is preferred.

The assembly of the invention may additionally include one or more removable ice packs disposed between the interior of the receptacle and the exterior of the food serving dish.

DETAILED DESCRIPTION

Figure 1:
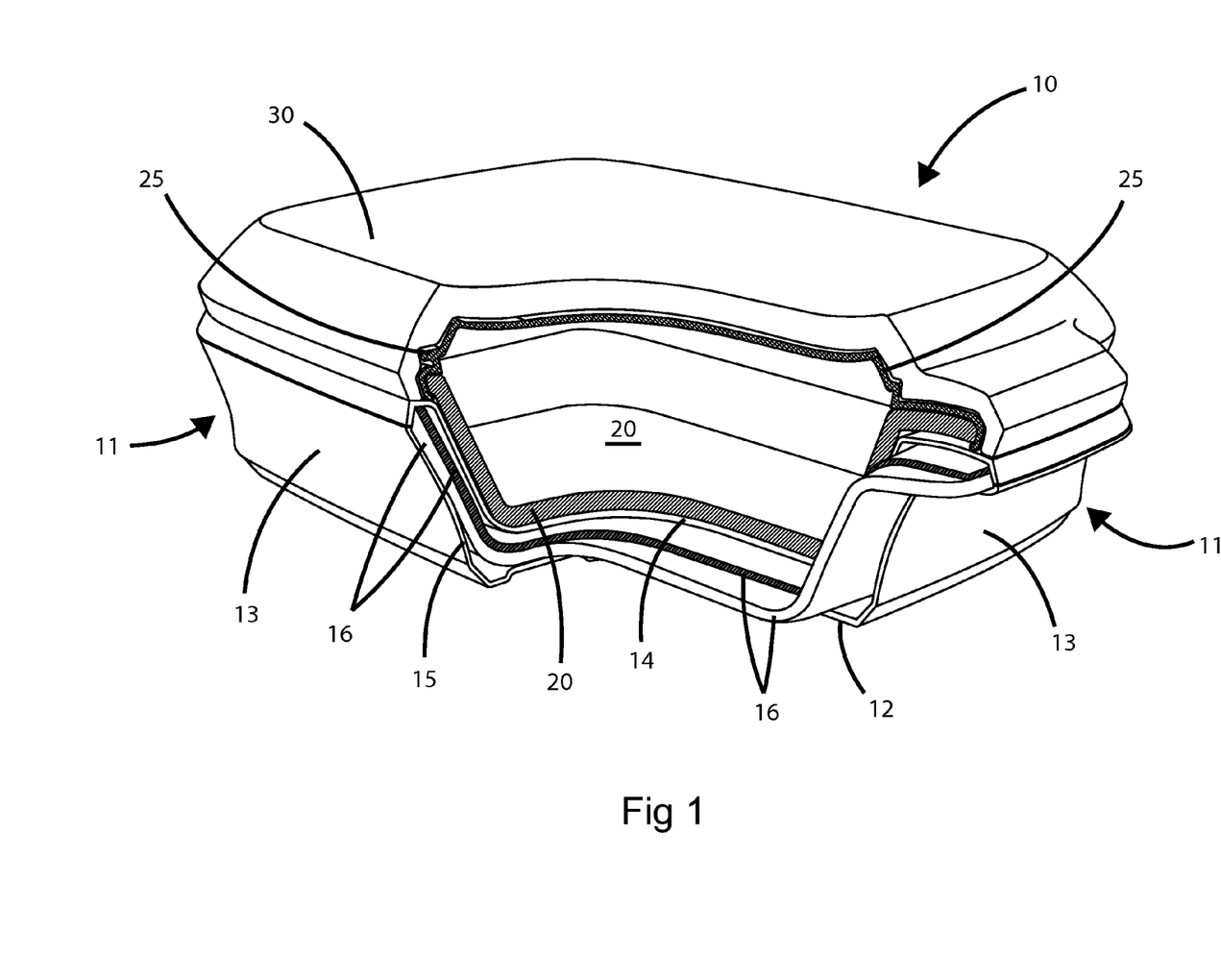
FIG. 1 is a perspective, partial cut away, view of one embodiment of the invention.
Figure 5:
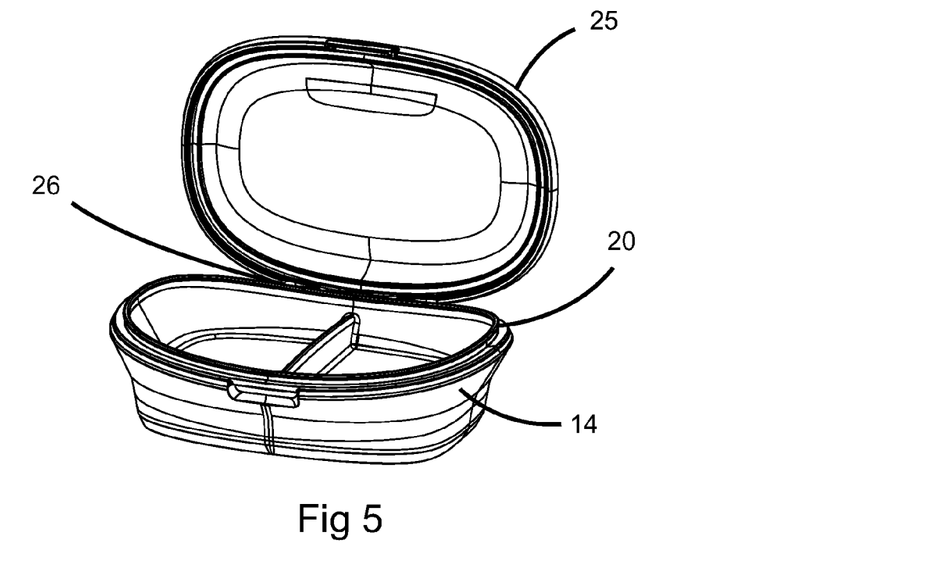
FIG. 5 is perspective view of the assembled embodiment of the invention illustrated in FIG. 4.
Figure 6:
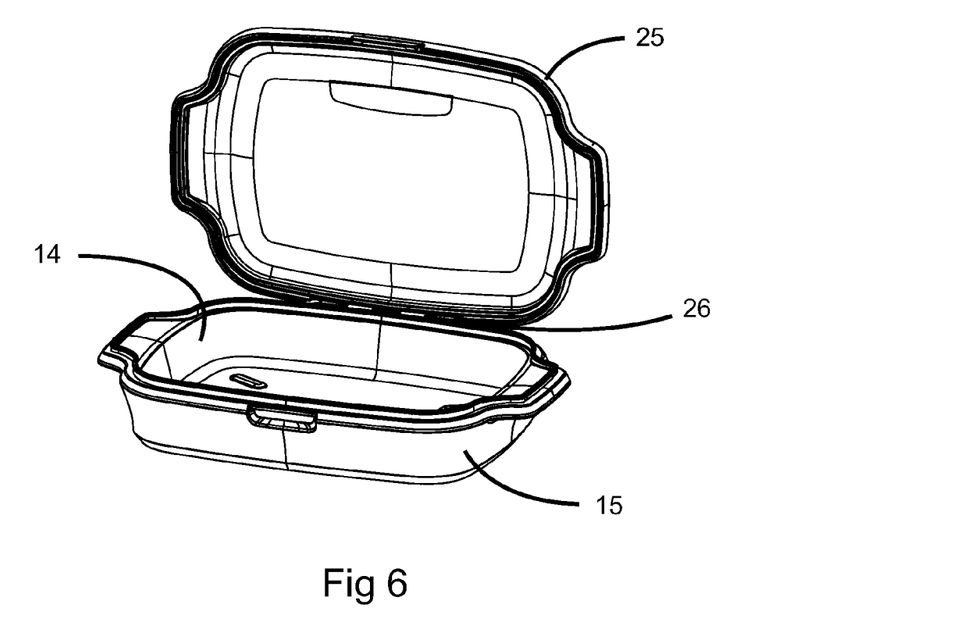
FIG. 6 is a perspective view of the assembled embodiment of the invention illustrated in FIG. 3.

Referring to FIG. 1, there is shown a first embodiment of the food service assembly of the invention, 10, composed of receptacle 11, which has a bottom, 12, and side walls, 13, and an open top (best seen in FIG. 5). Receptacle 11 is composed of an interior thermoplastic shell 14 and an exterior thermoplastic shell 15. The two shells are formed and arranged so as to be substantially superposable, with the interior shell being slightly smaller than the exterior shell. At their rims, the superposed shells are formed so as to meet each other: the rim of the interior shell is formed with an external flange and the rim of the exterior shell is formed with an internal flange so that the two rims meet at their edges and are sealed together, preferably by induction welding, a technique well know in the art. In this manner an internal hollow chamber or cavity is formed between interior she 14 and exterior shell 15. The hollow chamber extends throughout the bottom and sides of the receptacle, except at the rims where the internal and external flanges meet each other and are sealed together.

Within the hollow chamber created by the interior and exterior shells of the receptacle is a laminate, 16, Laminate 16 is composed of one or more layers of reflective material and one or more layers of open or closed cell foam or other backing material. Laminate 16 may additionally be composed of one or more layers of a high performance insulator or insulating material. As shown in the figures, laminate 16 is composed of a layer of reflective material and a layer of foam backing material. If an additional layer of a high performance insulating material is desired it should be disposed on the layer of backing material or open or closed cell foam, such that, the order of the materials forming the laminate is: high performance insulator—open or closed cell foam or backing material—reflective material. Within the receptacle, laminate 16 may be disposed with the reflective material either adjacent the interior shell, 14, or adjacent the exterior shell, 15. As mentioned, the laminate may be formed in one or more layers and if more than one layer is used, the order or stacking of the materials may vary, although maintaining a consistent order is preferable. For example, if a two layer laminate is desired the order of the materials would be insulator—foam—reflective material (comprising the first laminate layer)—insulator—foam—reflective material (comprising the second laminate layer).

Many kinds of reflective materials, backing materials or open or closed cell foam materials and high performance insulating materials may be used to create the laminate as long as each of the materials is conformable (for example by molding, twisting, stretching or cutting) to the shape of the receptacle and able to fit within the receptacle's internal hollow or air space. Exemplary reflective materials that may be used include a reflective polyester film such as Mylar®, an aluminum foil film, an air bubble film and aluminum foil such as Aerolam® and aluminum foil affixed polyethylene (PE) foam. Preferred as the reflective material is aluminum foil affixed PE foam. Exemplary backing materials and open and closed cell foams include spray polyurethane foam (SPF), polyisocyanurate foam, closed cell polyurethane spray foam, vacuum insulated panel foam, CFC/HCFC expanded polyurethane rigid panel foam, foil-faced polyurethane rigid panel foam, polyisocyanurate spray foam, phenolic spray foam, urea-pormaldehyde panel foam, urea foam, extruded expanded polystyrene (XPS), polystyrene board foam, phenolic rigid panel foam, urea-formaldehyde foam. As an alternative to an open or closed cell foam, other materials may be used, for example, high-density fiberglass batting, icynene loose fill, cellulose, perlite, fiberglass, vermiculite, Thermolam®, and Insul-Bright®, Exemplary optional high performance insulators include aerogels such as silica aerogels, carbon aerogels and metal oxide aerogels. Specific aerogels that may be used include Pyrogel XTF, Pyrogel XT, Cryogel Z, Cryogel x201, Pyrogel 2250, Pyrogel 6650, Spaceloft, Spaceloft Subsea (all available from Aspen Aerogels, Inc. Northborough, Mass.) and Aerogel Thermal Wrap (available from Cabot Corporation, Boston, Mass.). Additional high performance insulators that may be used include high performance polyurethanes, organic aerogels such as Slentite® (BASF SE, Ludwigshafen, Germany), and microfiber thermal insulators such as microfiber polyethylene or microfiber polyethylene and polypropylene mixtures such as Thinsulate® (3M, St. Paul, Minn.).

A wide variety of thermoplastic polymer materials may be used in composing receptacle 11. Exemplary thermoplastic polymers that may be used include polypropylene (PP), polyvinyl chloride (PVC), low density polyethylene (LDPE), polystyrene (PS), polytetrafluroethylene, polyarylsulfone (PESU), polycarbonate (PC), polymethylpentene (PMP), polytetrafluoroethylene (PTFE), polymethyl methacrylate (PMMA), styrene-acryonitrile (SAN) and acrylonitrile butadiene styrene (ABS). A preferred thermoplastic polymer is polypropylene.

Figure 2:
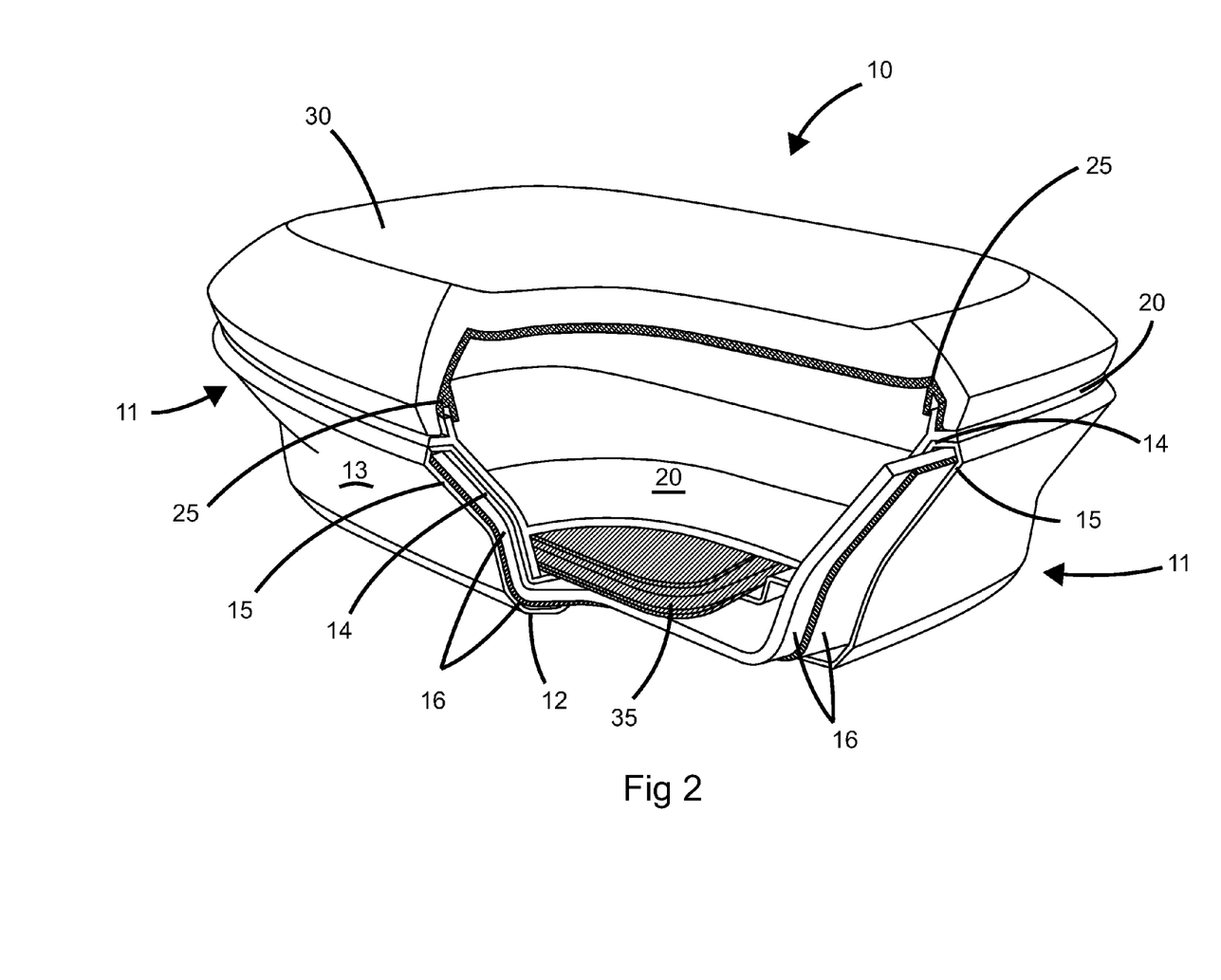
FIG. 2 is a perspective, partial cut away, view of a second embodiment of the invention.

Inside receptacle 11 there is positioned removable food serving dish 20, which is preferably formed to substantially conform to the inner dimensions of receptacle 11 as best seen in FIGS. 1 and 2. (In FIGS. 3 and 4, only an outline of the top of the dish is illustrated.) Food serving dish 20 may be composed of a glass material. Borosilicate glass or a tempered soda lime glass are preferred. Alternatively, food serving dish 20 may be composed of a plastic. A preferred plastic is ABS, acrylonitrile butadiene styrene.

Figure 3:
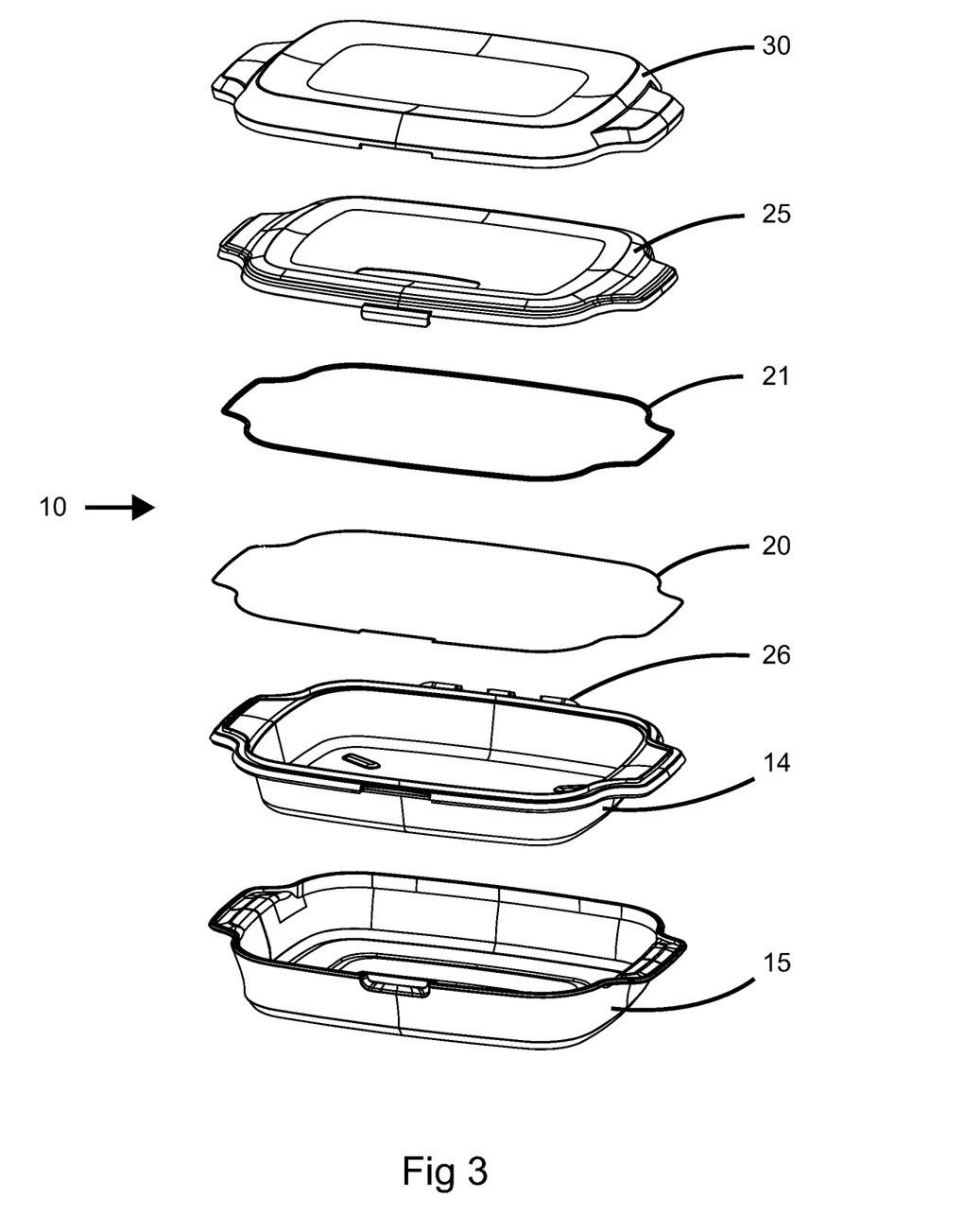
FIG. 3 is an exploded view of the embodiment of the invention illustrated in FIG. 1.
Figure 4:
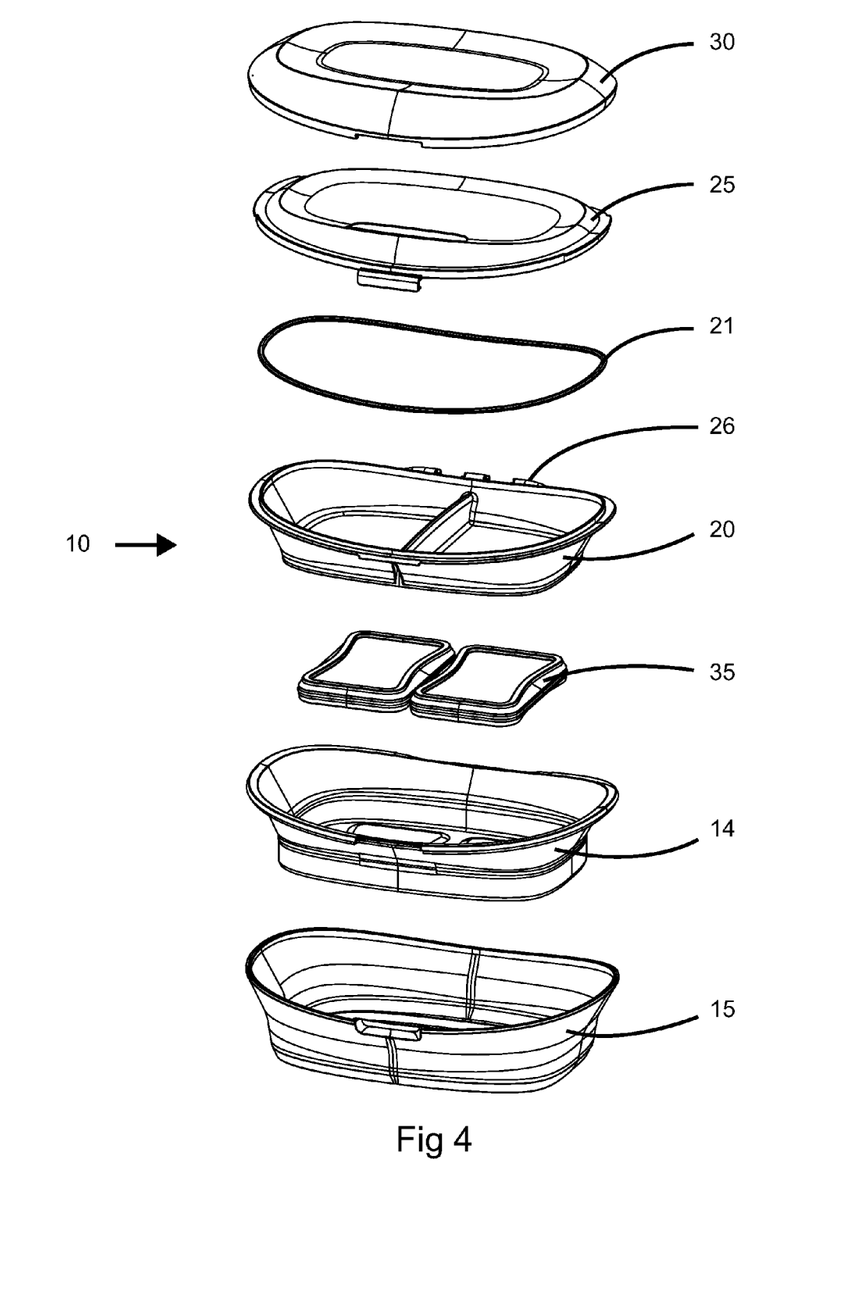
FIG. 4 is an exploded view of the embodiment of the invention illustrated in FIG. 2.

The assembly further includes a removable or demountable plastic lid, 25. Lid 25 may be formed and positioned to snap close over food serving dish 20 or it may be removably mounted to the assembly by means of a hinge connection, 26, best seen in FIGS. 3-6. This latter arrangement is preferred. In either arrangement, demountable plastic lid 25 may be formed to mount on either receptacle 11 or serving dish 20. If a hinged arrangement is employed, a partial hinge on lid 25 will mate with a partial hinge on either the rim of receptacle 11 or the rim of food serving dish 20 to form a complete hinge, 26, in a manner well known in the art. Optionally, in this arrangement, lid 25 may be formed with a snap close portion circumferentially opposed to the hinge so that the lid may be snap locked onto the receptacle or the serving dish when the lid is closed. (See FIGS. 3 and 4 where this is shown but not enumerated.) A gasket, 21, is positioned in lid 25 to assist in forming a tight seal between the lid and either the glass serving dish, as illustrated in FIG. 3, or the plastic serving dish as illustrated in FIG. 4. A preferred plastic material for the lid is a copolyester, and particularly preferred is Tritan™ copolyester (Eastman Chemical Company, Kingsport, Tenn.).

The invention may also include a lid cover, 30, shaped to substantially conform to the outer dimensions of lid 25 to be superposable thereon. Lid cover 30 is preferably composed of a foam material. Ethylene vinyl acetate is a preferred foam material that may be employed. The lid cover may be hinged, or, preferably, fully removable. In the latter circumstance, it can be place under the assembly and used as a trivet when food is ready to be served.

When the assembly is intended for keeping foods cold, one or more ice packs, 35, are provided. See FIGS. 2 and 4. Ice packs 35 are formed and positioned to seat between the interior bottom of the receptacle (i.e., on top of the interior thermoplastic shell 14) and the exterior bottom of the food serving dish 20. This is best seen in FIG. 2. As shown in FIG. 4 interior thermoplastic shell 14 may be formed with ice pack receiving panels in the bottom surface thereof (shown but not enumerated) to maintain the ice packs in position in the assembly. In FIG. 4, two ice packs are illustrated, but the number used may vary depending on the size of the assembly and the size of the ice packs used. Reusable ice packs (for example, Cool It! by Fit & Fresh® from MedPort, LLC, Providence, R.I.), are preferred although bagged ice may also be used.

When the assembly is intended for keeping foods hot, the ice packs, 35, can be replaced with one or more hot packs.

Each of the components making up the assembly optionally may be formed with a pair of opposed handles (shown but not enumerated in the figures) to make carrying the assembly easy.

All patents, publications, and other references cited herein are hereby incorporated by reference. Although the invention has been particularly described with reference to certain preferred embodiments, skilled artisans appreciate that changes in form and details may be made without departing from the scope of the appended claims.

What is claimed is:

1. A food serving assembly comprising a receptacle having a general shape of a serving dish with a flat bottom and upwardly extending side walls terminating in a rim and a separate, removable food serving dish disposed within the receptacle, the receptacle being composed of an exterior thermoplastic shell and an interior thermoplastic shell superposable on the exterior thermoplastic shell, the exterior and interior shells being formed and positioned to be sealed to each other at the rim to form a hollow chamber there between, the hollow chamber containing a laminate composed of one or more layers of reflective material, one or more layers of high performance insulator, and one or more layers of open or closed cell foam disposed between the reflective material and the high performance insulator.

2. The assembly according to claim 1 wherein the reflective material is composed of aluminum foil affixed polyethylene foam (PE).

3. The assembly according to claim 1 wherein the high performance insulator is aerogel.

4. The assembly according to claim 1 wherein the open or closed cell foam is polyethylene (PE) foam.

5. The assembly according to claim 1 wherein the interior and exterior shells of the receptacle are inductively welded together.

6. The assembly according to claim 1 wherein the thermoplastic is selected from the group consisting of polypropylene (PP), polyvinyl chloride (PVC), low density polyethylene (LDPE), polystyrene (PS), polyarylsulfone (PESU), polycarbonate (PC), polymethylpentene (PMP), polytetrafluoroethylene (PTFE), polymethyl methacrylate (PMMA), styrene-acryonitrile (SAN) and acrylonitrile butadiene styrene (ABS).

7. The assembly according to claim 6 wherein the thermoplastic is polypropylene.

8. The assembly according to claim 1 additionally comprising a demountable lid composed of plastic.

9. The assembly according to claim 8 wherein the demountable plastic lid is hingably coupled to the receptacle.

10. The assembly according to claim 8 wherein the demountable plastic lid is hingably coupled to the food serving dish.

11. The assembly according to claim 8 wherein the plastic is a copolyester.

12. The assembly according to claim 11 wherein the copolyester is Tritan® copolyester.

13. The assembly according to claim 8 additionally comprising a removable lid cover composed of a foam material and shaped so as to substantially conform to the outer dimensions of the lid so as to be superposable thereon.

14. The assembly according to claim 13 wherein the foam material is composed of ethylene vinyl acetate.

15. The assembly according to claim 1 wherein the food serving dish is composed of glass or plastic.

16. The assembly according to claim 15 wherein the glass is selected from a borosilicate glass and a tempered soda lime glass.

17. The assembly according to claim 15 wherein the plastic is acrylonitrile.

18. The assembly according to claim 17 additionally comprising one or more removable ice packs disposed between the interior of the receptacle and the exterior of the food serving dish.

19. A food serving assembly comprising (1) a receptacle having a general shape of a serving dish with a flat bottom and upwardly extending side walls terminating in a rim and a separate, removable food serving dish disposed within the receptacle, the receptacle being composed of an exterior thermoplastic shell and an interior thermoplastic shell superposable on the exterior thermoplastic shell, the thermoplastic being selected from the group consisting of polypropylene (PP), polyvinyl chloride (PVC), low density polyethylene (LDPE), polystyrene (PS), polyarylsulfone (PESU), polycarbonate (PC), polymethylpentene (PMP), polytetrafluoroethylene (PTFE), polymethyl methacrylate (PMMA), styrene-acrylonitrile (SAN) and acrylonitrile butadiene styrene (ABS), the exterior and interior shells being formed and positioned to be sealed to each other at the rim to form a hollow chamber there between, (2) a demountable lid composed of plastic and (3) a removable lid cover composed of a foam material and shaped so as to substantially conform to the outer dimensions of the lid so as to be superposable thereon.

20. The assembly according to claim 19 wherein the hollow chamber of the receptacle contains a laminate composed of one or more layers of reflective material and one or more layers of open or closed cell foam.

21. The assembly according to claim 20 wherein the laminate is composed of an additional one or more layers of a high performance insulator.

22. The assembly according to claim 21 wherein the laminate comprises one layer and the foam is disposed between the high performance insulator and the reflective material.

23. The assembly according to claim 20 wherein the reflective material is composed of aluminum foil affixed polyethylene foam (PE).

24. The assembly according to claim 21 wherein the high performance insulator is aerogel.

25. The assembly according to claim 20 wherein the open or closed cell foam is polyethylene (PE) foam.

26. The assembly according to claim 19 wherein the interior and exterior shells of the receptacle are inductively welded together.

27. The assembly according to claim 19 wherein the demountable plastic lid is hingably coupled to the receptacle.

28. The assembly according to claim 19 wherein the demountable plastic lid is hingably coupled to the food serving dish.

29. The assembly according to claim 19 wherein the demountable plastic lid plastic is a copolyester.

30. The assembly according to claim 29 wherein the copolyester is Tritan® copolyester.

31. The assembly according to claim 19 wherein the removable lid cover foam material is ethylene vinyl acetate.

32. The assembly according to claim 19 wherein the food serving dish is composed of glass or plastic.

33. The assembly according to claim 32 wherein the glass is selected from a borosilicate glass and a tempered soda lime glass.

34. The assembly according to claim 32 wherein the plastic is acrylonitrile butadiene styrene (ABS).

35. The assembly according to claim 34 additionally comprising one or more removable ice packs disposed between the interior of the receptacle and the exterior of the food serving dish.

36. The assembly according to claim 19 wherein the thermoplastic is polypropylene.

* * * * *